US011596137B2

(12) United States Patent
Horning

(10) Patent No.: US 11,596,137 B2
(45) Date of Patent: Mar. 7, 2023

(54) LANTERNFLY TRAP

(71) Applicant: Raymond H. Horning, Lebanon, PA (US)

(72) Inventor: Raymond H. Horning, Lebanon, PA (US)

( * ) Notice: Subject to any disclaimer, the term of this patent is extended or adjusted under 35 U.S.C. 154(b) by 0 days.

(21) Appl. No.: 17/521,462

(22) Filed: Nov. 8, 2021

(65) Prior Publication Data

US 2022/0211022 A1 Jul. 7, 2022

Related U.S. Application Data

(60) Provisional application No. 63/134,107, filed on Jan. 5, 2021.

(51) Int. Cl.
*A01M 1/10* (2006.01)
*A01M 1/18* (2006.01)

(52) U.S. Cl.
CPC ............ *A01M 1/103* (2013.01); *A01M 1/106* (2013.01); *A01M 1/18* (2013.01)

(58) Field of Classification Search
CPC ............ A01M 1/00; A01M 1/02; A01M 1/10; A01M 1/103; A01M 1/106; A01M 1/12; A01M 1/18
USPC .......................... 43/108, 107, 122; 47/50–54
See application file for complete search history.

(56) References Cited

U.S. PATENT DOCUMENTS

| 306,007 | A | * | 9/1884 | Downs | A01M 1/18 |
| | | | | | 43/108 |
| 322,523 | A | * | 7/1885 | Cook | A01M 1/18 |
| | | | | | 43/108 |
| 505,226 | A | * | 9/1893 | Noone | A01M 1/18 |
| | | | | | 43/108 |
| 933,483 | A | * | 9/1909 | Mohr | A01G 13/105 |
| | | | | | 47/32.4 |
| 1,293,563 | A | * | 2/1919 | Siegler | A01M 1/18 |
| | | | | | 43/108 |
| 1,311,001 | A | * | 7/1919 | Manseau | A01M 1/18 |
| | | | | | 43/108 |
| 2,170,589 | A | * | 8/1939 | Erickson | A01M 1/20 |
| | | | | | 47/32.4 |
| 2,240,766 | A | * | 5/1941 | Elder | A01M 1/20 |
| | | | | | 43/108 |

(Continued)

FOREIGN PATENT DOCUMENTS

| CA | 2849615 A1 * 10/2014 | ............ A01G 13/105 |
| CA | 2849635 A1 * 10/2014 | ............ A01M 1/103 |

(Continued)

*Primary Examiner* — Darren W Ark

(57) ABSTRACT

A bug trap apparatus suited for trapping and killing lanternflies is presented. More specifically, the present invention traps and kills lanternflies, specifically emplacing the present invention in nesting areas, feeding areas, or any other areas where lanternflies congregate. The bug trap apparatus comprises an enclosure, a mounting frame, and at least one capturing element. The at least one capturing element each comprises a trap body, a trap entrance, and a trap reservoir. The at least one capturing element is distributed about the mounting frame. The mounting frame is positioned within the enclosure. The trap entrance and the trap base are positioned terminally opposite to each other along the trap body. The trap reservoir is positioned within the trap body. The trap entrance traverses within the trap reservoir.

4 Claims, 6 Drawing Sheets

(56) References Cited

U.S. PATENT DOCUMENTS

| | | | | |
|---|---|---|---|---|
| 2,253,541 A * | 8/1941 | Torbett | ............... | A01M 1/18 43/108 |
| 2,261,360 A * | 11/1941 | Gerendas | ............ | A01M 1/2055 43/108 |
| 2,649,680 A * | 8/1953 | Brown | ............... | A01D 46/26 47/32.4 |
| 2,746,201 A * | 5/1956 | Warrell | ............... | A01M 1/18 43/108 |
| 3,968,590 A * | 7/1976 | Kitterman | ............ | A01M 1/02 43/107 |
| 4,098,018 A | 7/1978 | Bartelme | | |
| 4,471,563 A * | 9/1984 | Lindgren | ............. | A01M 1/106 43/122 |
| 6,230,435 B1 * | 5/2001 | Carman | ............. | A01G 13/105 43/108 |
| 6,269,589 B1 * | 8/2001 | Bouler | ............... | A01G 9/023 47/65.5 |
| 6,589,545 B1 * | 7/2003 | Ramsey | ............. | A01M 1/026 424/407 |
| 6,860,062 B2 | 3/2005 | Spragins | | |
| 8,371,473 B2 * | 2/2013 | Scribner | ............. | A01K 7/027 47/65.5 |
| 9,549,543 B2 * | 1/2017 | Bodo | ............. | A01M 1/103 |
| 2003/0186604 A1 * | 10/2003 | Nourigat | ............. | A01M 1/04 428/114 |
| 2006/0236591 A1 * | 10/2006 | Cwiklinski | ............ | A01M 1/02 43/107 |
| 2013/0212926 A1 * | 8/2013 | McGavin | ............. | A01M 1/106 43/107 |
| 2014/0317994 A1 * | 10/2014 | Bodo | ............. | A01M 29/34 43/108 |
| 2014/0317995 A1 * | 10/2014 | Bodo | ............. | A01M 1/103 43/108 |
| 2015/0121746 A1 * | 5/2015 | Osinga | ............. | A01N 49/00 43/132.1 |
| 2017/0238522 A1 * | 8/2017 | Wakarchuk | ............ | A01M 1/103 |
| 2021/0045297 A1 * | 2/2021 | Bergey | ............. | A01M 29/34 |
| 2021/0051864 A1 * | 2/2021 | Washko | ............. | A01M 1/18 |

FOREIGN PATENT DOCUMENTS

| | | | | |
|---|---|---|---|---|
| CN | 108555928 B | * | 10/2021 | ............ A01M 1/00 |
| EP | 3690243 B1 | * | 4/2022 | ............ F04B 1/0408 |
| FR | 2691045 A1 | * | 11/1993 | ............ A01G 13/105 |
| FR | 2946834 A1 | * | 12/2010 | ............ A01G 13/105 |
| JP | 2012210200 A | * | 11/2012 | |
| JP | 2020065523 A | * | 4/2020 | |
| KR | 20080019673 A | * | 3/2008 | |
| WO | WO2000024248 A2 | | 11/2000 | |

* cited by examiner

LANTERNFLY TRAP

The current application claims a priority to the U.S. Provisional Patent application Ser. No. 63/134,107 filed on Jan. 5, 2021.

FIELD OF THE INVENTION

The present invention relates generally to a bug trap. More specifically, the present invention provides an apparatus to trap and kill lanternflies.

BACKGROUND OF THE INVENTION

Invasive species can quickly become a major threat to native plants, animals, and agriculture businesses, since the lack of natural enemies allows them to multiply rapidly and unchecked in a non-native environment that cannot combat them naturally. This is especially true of the spotted lanternfly that is indigenous to parts of China, India, Vietnam, and eastern Asia, which expands its wings to expose bright colors to scare away predators when threatened. The spotted lanternfly instinctively climbs trees to feed, mate, lay eggs and launch themselves over large distances towards their next intended target. The spotted lanternfly can lay between 30 and 50 eggs that are then covered with a protective waxy coating during the fall season which requires physical removal to destroy.

Current spotted lanternfly control methods include insecticides to kill them. Insecticides can be very effective when applied directly onto the spotted lanternflies as they kill through direct contact and absorption by the pest. If the spotted lanternflies are not treated directly, they must accumulate sufficient residual insecticide from, for example, the tree bark to be deadly. However, insecticide sprays dry quickly after which they do not transfer as readily to the insect's body and ultimately lose their effectiveness as they degraded over time. Additionally, since the spotted lanternflies crawl to the far reaches of a targeted tree, the insecticide must be sprayed indiscriminately over a very large surface area, resulting in over-use of insecticide, potential harm to native insects that form the bottom of the local food chain, and a very low pesticide kill ratio.

An objective of the present invention is to provide an efficient and entertaining trap for catching lanternflies, stink bugs, or similar types of insects. The present invention allows a user to install the lanternfly trap on a tree trunk. The lanternfly trap attracts and traps the bugs. The trapped bugs would eventually fall into cups that contain water and drown. Additional features and benefits are further discussed in the sections below.

SUMMARY OF THE INVENTION

The present invention is a bug trap apparatus suited for trapping and killing lanternflies. More specifically, the present invention traps and kills lanternflies, specifically emplacing the present invention in nesting areas, feeding areas, or any other areas where lanternflies congregate. In various embodiments, the bug trap apparatus and the components that constitutes the bug trap apparatus may be modified such that the bug trap apparatus may trap other pest bugs, such as, but not limited to invasive beetles, stinkbugs, or any other pest insect, bug, or animal. The bug trap apparatus comprises an enclosure, a mounting frame, and at least one capturing element. The at least one capturing element each comprises a trap body, a trap entrance, and a trap reservoir. The at least one capturing element is distributed about the mounting frame. The mounting frame is positioned within the enclosure. The trap reservoir is positioned within the trap body.

The trap entrance traverses within the trap reservoir.

DETAIL DESCRIPTIONS OF THE INVENTION

Figure 1:
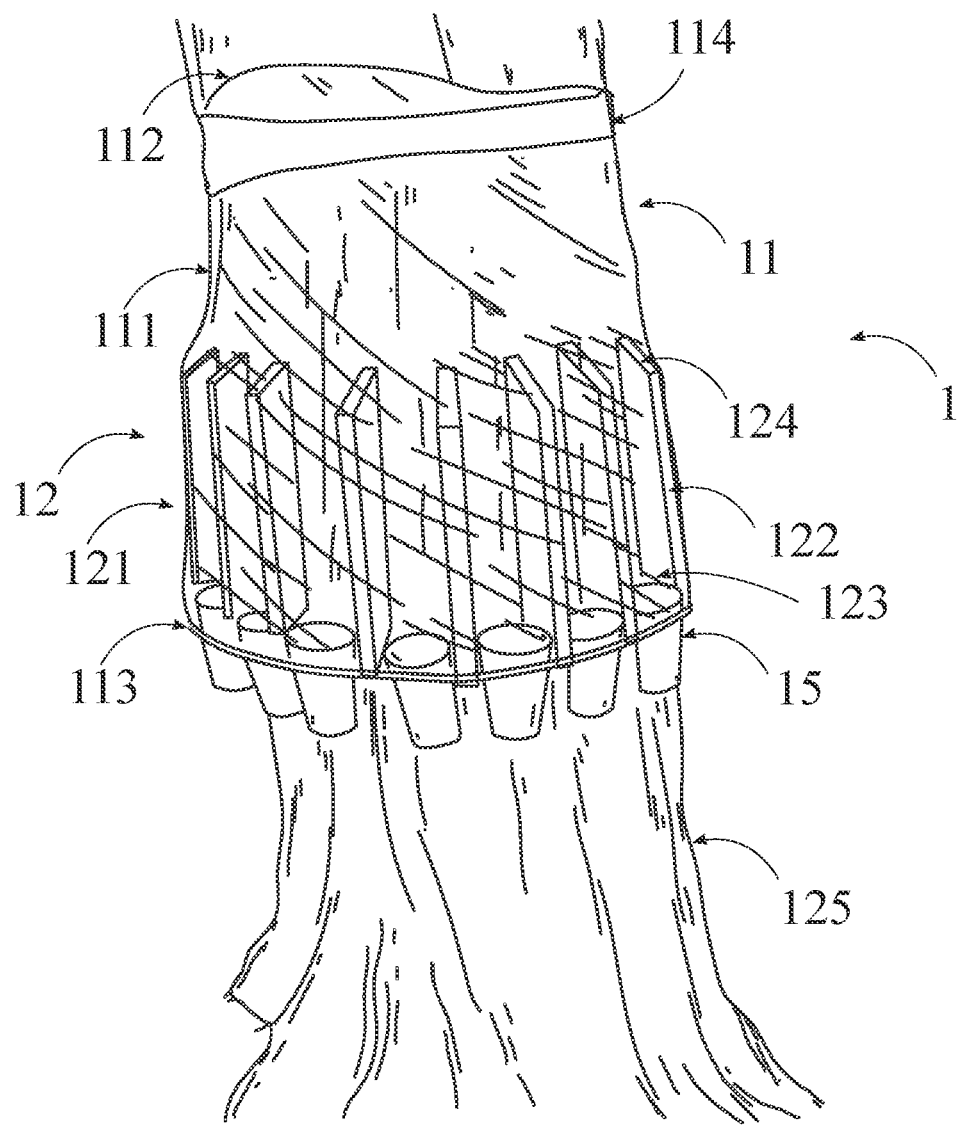
FIG. 1 is an illustration of the present invention, in accordance with one embodiment installed along a tree.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-3 and 5-6, the present invention is a bug trap apparatus 1 suited for trapping and killing lanternflies 3. More specifically, the present invention traps and kills lanternflies 3, specifically emplacing the present invention in nesting areas, feeding areas, or any other areas where lanternflies 3 congregate. In various embodiments, the bug trap apparatus 1 and the components that constitute the bug trap apparatus 1 may be modified such that the bug trap apparatus 1 may trap other pest bugs, such as, but not limited to invasive beetles, stinkbugs, or any other pest insect, bug, or animal. The bug trap apparatus 1 comprises an enclosure 11, a mounting frame 12, and at least one capturing element 15. The at least one capturing element 15 each comprises a trap body 151, a trap entrance 152, and a trap reservoir 153. The at least one capturing element 15 is distributed about the mounting frame 12. The mounting frame 12 is positioned within the enclosure 11. The trap reservoir 153 is positioned within the trap body 151. The trap entrance 152 traverses within the trap reservoir 153.

Figure 3:
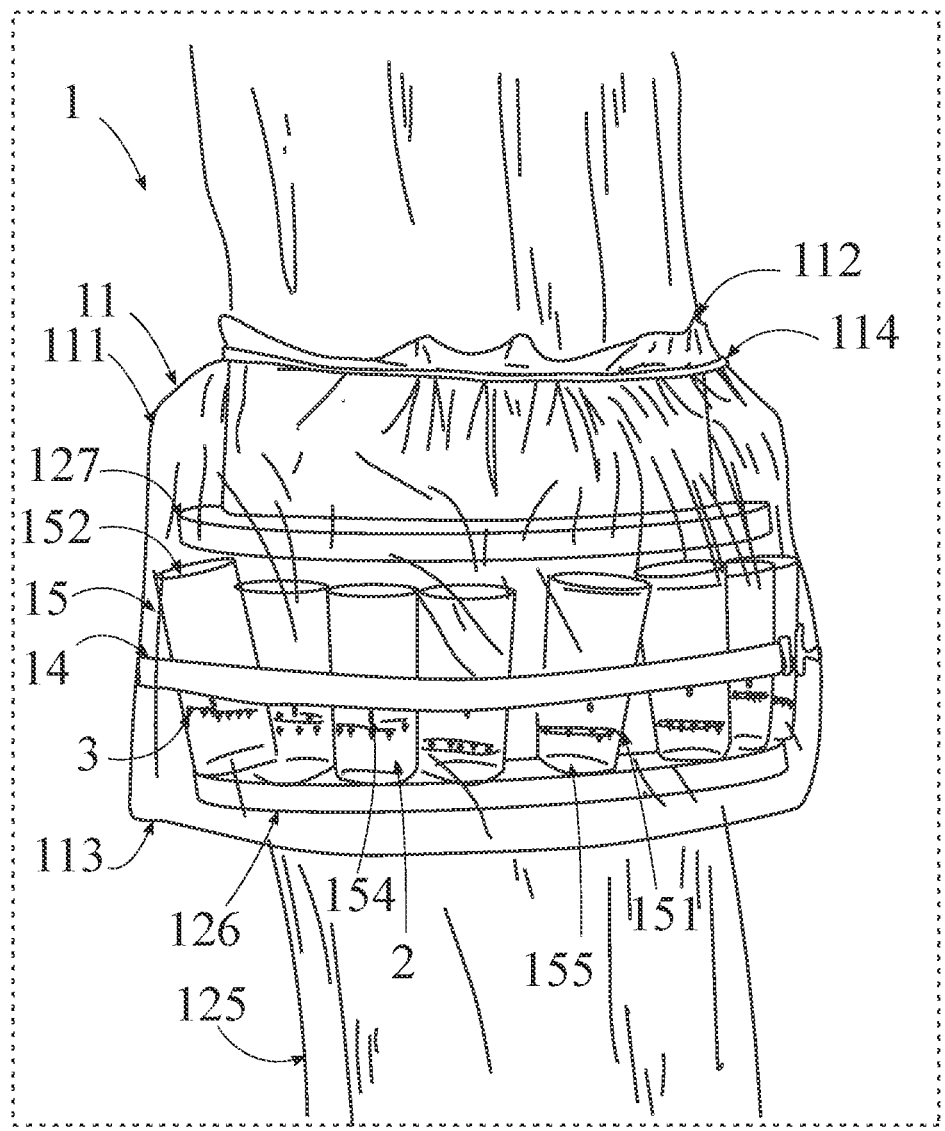
FIG. 3 is an illustration of the present invention, in accordance with another embodiment installed along a tree.
Figure 4:
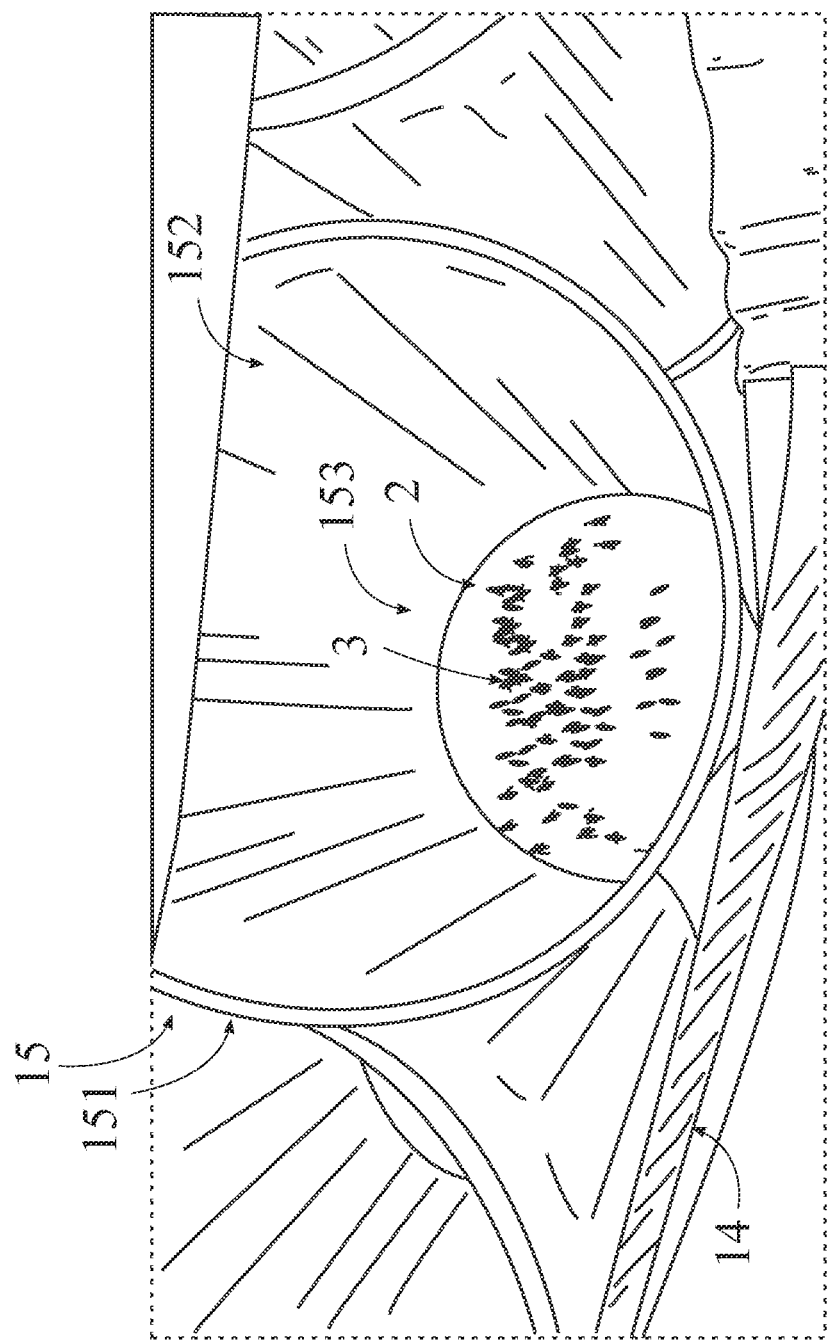
FIG. 4 is an illustration of the present invention that shows lanternflies trapped within at least one capturing element.
Figure 5:
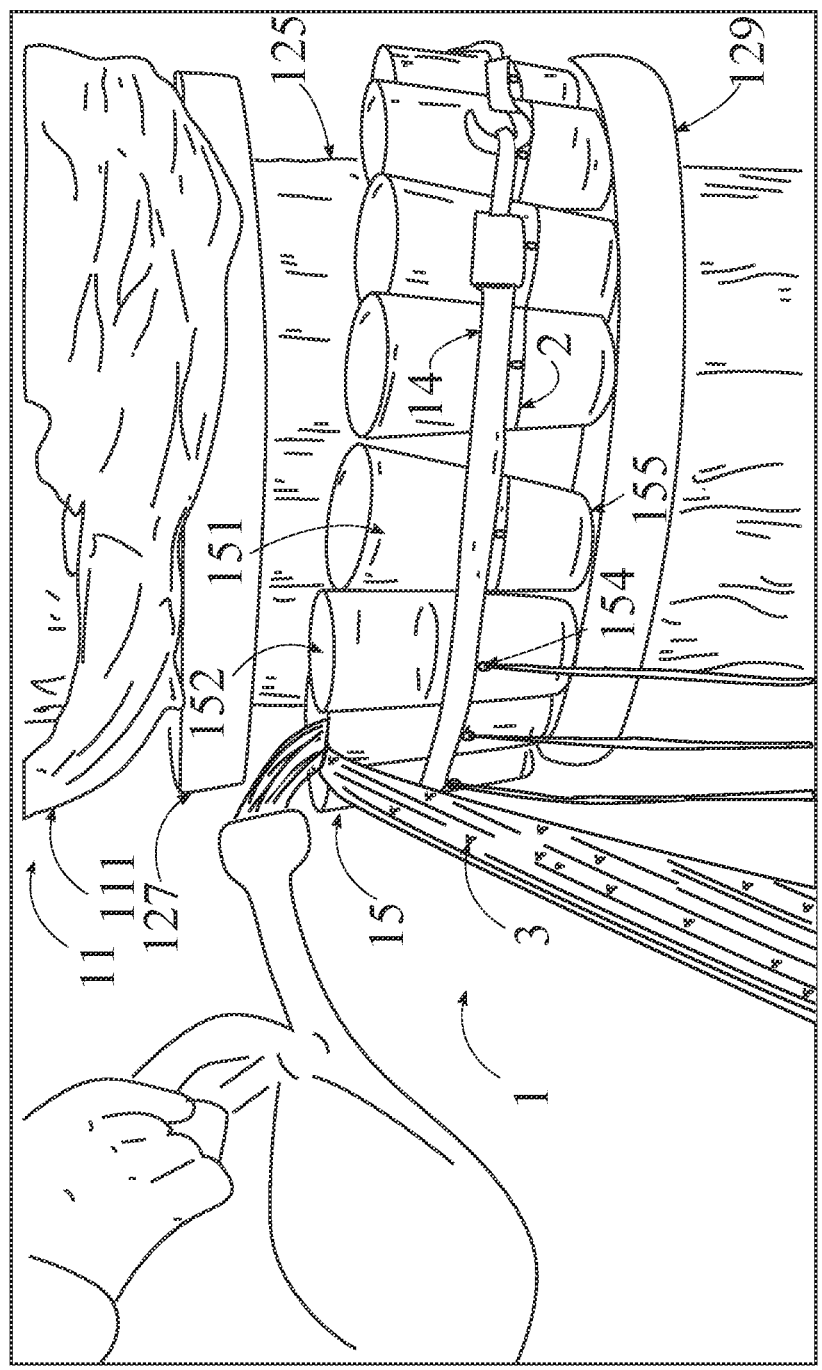
FIG. 5 is an illustration of the present invention that shows lanternflies being flushed out of the at least one capturing element.
Figure 6:
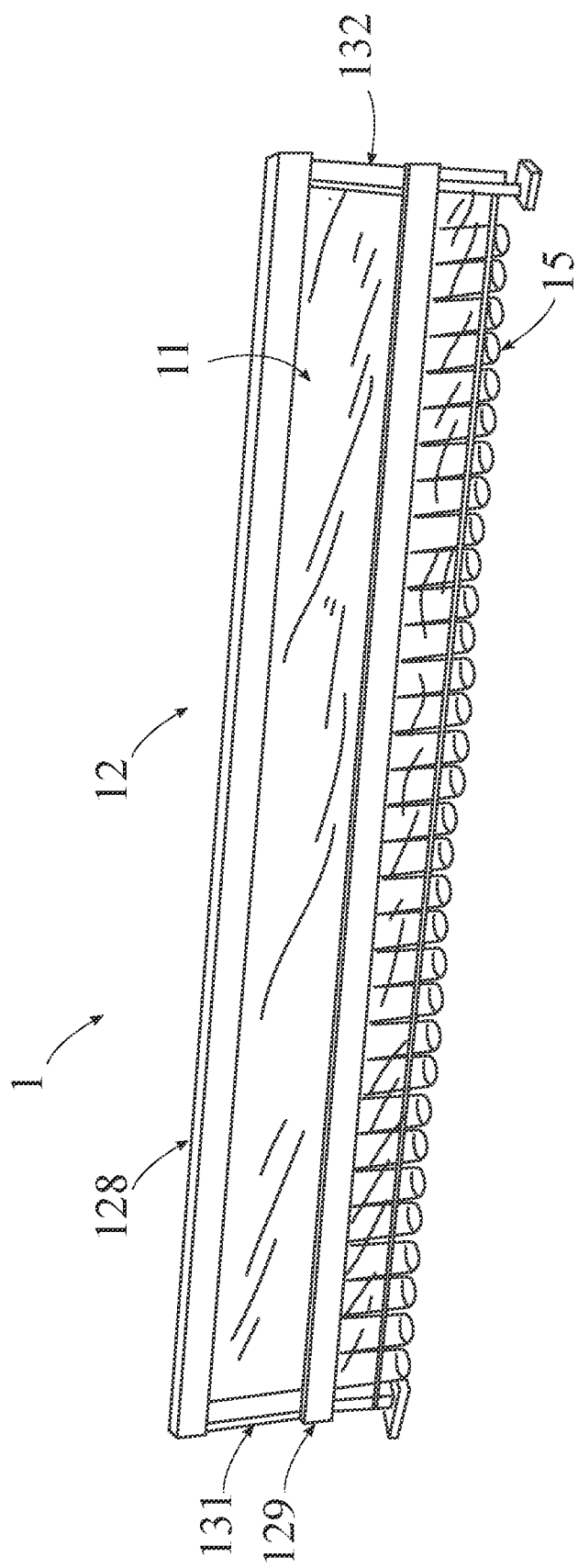
FIG. 6 is an illustration of the present invention in accordance to another embodiment used to install along a wall or any other surface other than the tree.

In the preferred embodiment of the present invention, the mounting frame 12 may take the form of any suitable mounting structure suitable for mounting and affixing the components that constitutes the bug trap apparatus 1 to a tree or any other suitable mounting body 125, as shown in FIGS. 1, 3, and 5. In one embodiment, the mounting frame 12 may take the form of a standalone structure, such that the bug trap apparatus 1 may be mounting along a wall, building, fence, or implanted along a flat surface, as shown in FIG. 6. In the preferred embodiment of the present invention, the mounting frame 12 is made out any suitable durable material suitable for outdoor use, such as, but not limited to wood, plastic polymers, aluminum, fiberglass, or any other suitable material. In the preferred embodiment of the present invention, the enclosure 11 is made out of a translucent material. In the preferred embodiment of the present invention, the trap reservoir 153 may take the form of the interior portion of the at least one capturing element 15 that holds a specified volume of water 2. Additionally, the trap reservoir 153 prevents lanternflies 3 trapped within the at least one capturing element 15 from climbing out of the trap reservoir 153, as shown in FIG. 4. In the preferred embodiment of the present invention, the trap reservoir 153 is made out of a smooth or slippery surface, such that the lanternflies 3 do not climb out of the at least on capturing element.

In the preferred embodiment of the present invention, the enclosure 11 may take the form of a shroud wrap that covers the mounting frame 12 and the at least one capturing element 15, as shown in FIGS. 1, 3, and 5-6. More specifically, the enclosure 11 may take the form of a plastic wrap that directs the lanternflies 3 to crawl along the mounting body 125, such that the lanternflies 3 are directed to the at least one capturing element 15. The enclosure 11 also secures the bug trap apparatus 1 from outside elements, such as, but not limited to rain, wind, human or animal interference, or any other outside element that may damage or interfere the trapping function and integrity of the bug trap apparatus 1.

In the preferred embodiment of the present invention, the at least one capturing element 15 may take the form of a series of pitcher style traps that lures, traps, and kills lanternflies 3. More specifically, the at least one capturing element 15 may take the form of a series of cups with smooth surfaces where the cups are filled with water at a specified volume. The lanternflies 3 will fall within the cup and will not be able to climb the trap reservoir 153. The lanternflies 3 will eventually drown, leaving dead lanternflies 3 as the end product, as shown in FIG. 4. Once the at least one capturing element 15 need servicing, the at least one capturing element 15 may be flushed out with fresh water and filled with water at a specified volume to start the entrapment process again, as shown in FIG. 5.

In the preferred embodiment of the present invention, the at least one capturing element 15 each comprises a trap entrance 152, a trap base 155 and an overflow aperture 154. The trap entrance 152 and the trap base 155 are positioned terminally opposite to each other along the trap body 151. The overflow aperture 154 traverses within the trap reservoir 153. The overflow aperture 154 is positioned between the trap entrance 152 and the trap base 155. The trap base 155 serves as bottom portion of trap body 151 where the base is configured to hold a specified volume of water 2. The trap entrance 152 serves as the trap opening for the lanternflies 3 to enter the trap body 151. The overflow aperture 154 may take the form of a strategically place overflow port that sets the specified volume of water 2 that the trap body 151 may hold. More specifically, a user will flush out the trap body 151 by pouring fresh water along the trap entrance 152 where the dead lanternflies 3 will flush out along the overflowing downpour along the trap entrance 152, as shown in FIG. 5. The overflow aperture 154 is configured to seep out the excess fresh water until the trap body 151 comprises the specified volume of water 2, as shown in FIG. 5.

In the preferred embodiment of the present invention, the enclosure 11 comprises a wrap body 111, as shown in FIGS. 1, 3, and 5. The wrap body 111 comprises an upper wrap end 112 and a lower wrap end 113, as shown in FIGS. 1, 3, and 5. The wrap body 111 is perimetrically connected to the mounting frame 12. The upper wrap end 112 and the lower wrap end 113 are positioned terminally opposite to each other along the wrap body 111. The upper wrap end 112 is perimetrically connected to the mounting frame 12 through a mounting strap 114. The wrap body 111 serves as the main enclosure 11 body that covers the upper portion of the mounting frame 12 but leaves the bottom portion of the mounting frame 12 open, such that the lanternflies 3 can enter the bug trap apparatus 1 from the bottom. More specifically, lanternflies 3 from the ground will crawl along a tree, wall, building, or any other mounting body 125. The bug trap apparatus 1 will intercept the lanternflies 3 crawling from the bottom, directing the lanternflies 3 to the at least one capturing element 15.

Figure 2:
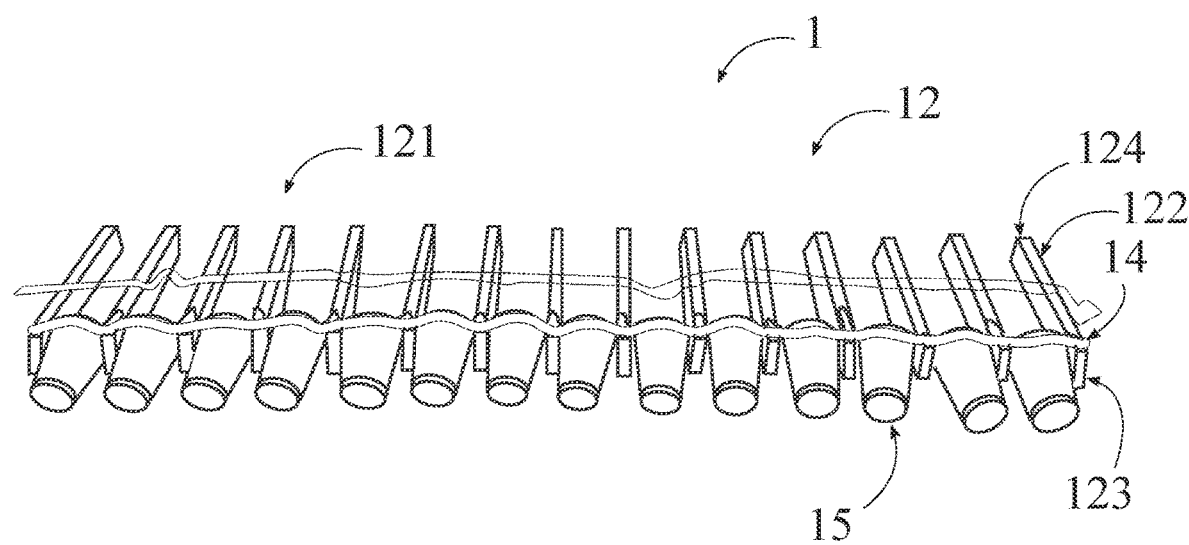
FIG. 2 is an illustration of the present invention, in accordance with one embodiment.

In one embodiment of the present invention, the mounting frame 12 comprises at least one mounting panel 121, as shown in FIGS. 1-2. Each of the at least one capturing element 15 is connected to each of the at least one mounting panel 121 through a fastening strap 14, as shown in FIG. 2. In this embodiment, the bug trap apparatus 1 is constructed out of a series of structural panels that are perimetrically emplaced along a tree. The vertically emplaced mounting panels may take the form of landscaping beams but may take the form of any other suitable paneling component, such as, but not limited to wooden panels, plastic panels, aluminum panels, or any other suitable panels. In this embodiment, the mounting panel mounts and divides each of the at least one capturing element 15 making the at least one capturing element 15 potentially easier to manage.

In this embodiment of the present invention, each of the at least one mounting panel 121 comprises a panel body 122, a trap mounting end, 123 and a ramp end 124, as shown in FIGS. 1-2. The trap mounting end 123 and the ramp end 124 are positioned terminally opposite to each other along the panel body 122. The trap entrance 152 is connected adjacent to the trap mounting end 123, opposite to the ramp end 124. The panel body 122 may take the form of the main panel chassis that runs vertically along the tree, as shown in FIG. 1. The trap mounting end 123 serves as the lower portion of the panel body 122 that mounts one of the at least one capturing element 15 along the trap mounting end 123. The ramp end 124 serves as the upper portion of the panel body 122, where the upper portion secures the enclosure 11 along the mounting frame 12, as shown in FIG. 1. In this embodiment of the present invention, the mounting frame 12 further comprises a mounting body 125, as shown in FIG. 1. The at least one capturing element 15 is perimetrically connected along the mounting body 125, as shown in FIGS. 1-2. In this embodiment, the mounting body 125 may take the form of the tree that the at least one mounting panel 121 is secured along, but may take the form of any vertical structure, such as, but not limited to ground posts, stands, poles, or any other suitable mounting body 125 that mounts the at least one mounting panel 121 in a vertical orientation along the mounting body 125.

In another embodiment of the present invention, the mounting frame 12 comprises a lower bushing 126 and an upper bushing 127. The lower bushing 126 and the upper bushing 127 are connected along the mounting body 125. The at least one capturing element 15 is perimetrically distributed along the mounting body 125 between the lower bushing 126 and the upper bushing 127. The at least one capturing element 15 is perimetrically connected along the mounting body 125 through the fastening strap 14. In this embodiment, the lower bushing 126 and the upper bushing 127 may take the form of cylindrical mounting platforms that attaches along the mounting body 125, as shown in FIGS. 3 and 5. In this embodiment, the upper wrap end 112 is perimetrically positioned to the upper bushing 127. The lower wrap end 113 is perimetrically positioned to the lower bushing 126. The lower bushing 126 secures the at least one capturing element 15 along the mounting frame 12. The upper bushing 127 secures the enclosure 11 along the mounting body 125.

In another embodiment of the present invention, the mounting frame 12 comprises an upper longitudinal beam 128, a lower longitudinal beam 129, a first lateral beam 131, and a second lateral beam 132, as shown in FIG. 6. The first lateral beam 131 and the second lateral beam 132 are terminally connected to the upper longitudinal beam 128 and the second longitudinal beam. The at least one capturing element 15 is longitudinally connected and distributed about the lower longitudinal beam 129. The enclosure 11 is delineated along the mounting frame 12. In this embodiment, the mounting frame 12 may take the form of a standalone frame that installs along a wall, building, fence, or any other suitable flat surface structure. The upper longitudinal beam 128, the lower longitudinal beam 129, the first lateral beam 131, and the second lateral beam 132 secures the enclosure 11 along the at least one capturing element 15. The lower longitudinal beam 129 secures the at least one capturing element 15 along the mounting frame 12.

Although the invention has been explained in relation to its preferred embodiment, it is to be understood that many other possible modifications and variations can be made without departing from the spirit and scope of the invention as hereinafter claimed.

What is claimed is:

1. A bug trap apparatus comprising:
   an enclosure;
   a mounting frame; and
   at least one capturing element;
   the at least one capturing element each comprising a trap body, a trap entrance, a trap base and a trap reservoir;
   the at least one capturing element being distributed about the mounting frame;
   the mounting frame being positioned within the enclosure;
   the trap entrance and the trap base being positioned terminally opposite to each other along the trap body;
   the trap reservoir being positioned within the trap body;
   the trap entrance traversing within the trap reservoir;
   the mounting frame comprising a mounting body, a lower bushing, and an upper bushing;
   the lower bushing and the upper bushing being connected along the mounting body;
   the at least one capturing element being perimetrically distributed along the mounting body between the lower bushing and the upper bushing; and
   the at least one capturing element being perimetrically connected along the mounting body through a fastening strap.

2. The bug trap apparatus as claimed in claim 1, wherein the at least one capturing element further comprising:
   an overflow aperture;
   the overflow aperture traversing within the trap reservoir; and
   the overflow aperture being positioned between the trap entrance and the trap base.

3. The bug trap apparatus as claimed in claim 1, comprising:
   the enclosure comprising a wrap body;
   the wrap body comprising an upper wrap end and a lower wrap end;
   the wrap body being perimetrically connected to the mounting frame;
   the upper wrap end and the lower wrap end being positioned terminally opposite to each other along the wrap body; and
   the upper wrap end being perimetrically connected to the mounting frame through a mounting strap.

4. The bug trap apparatus as claimed in claim 1, wherein the enclosure is constructed out of a translucent material.

* * * * *